March 27, 1962 A. F. GLAUBKE 3,027,154
ALIGNING AND CLAMPING FIXTURE
Filed Oct. 14, 1959 3 Sheets-Sheet 2
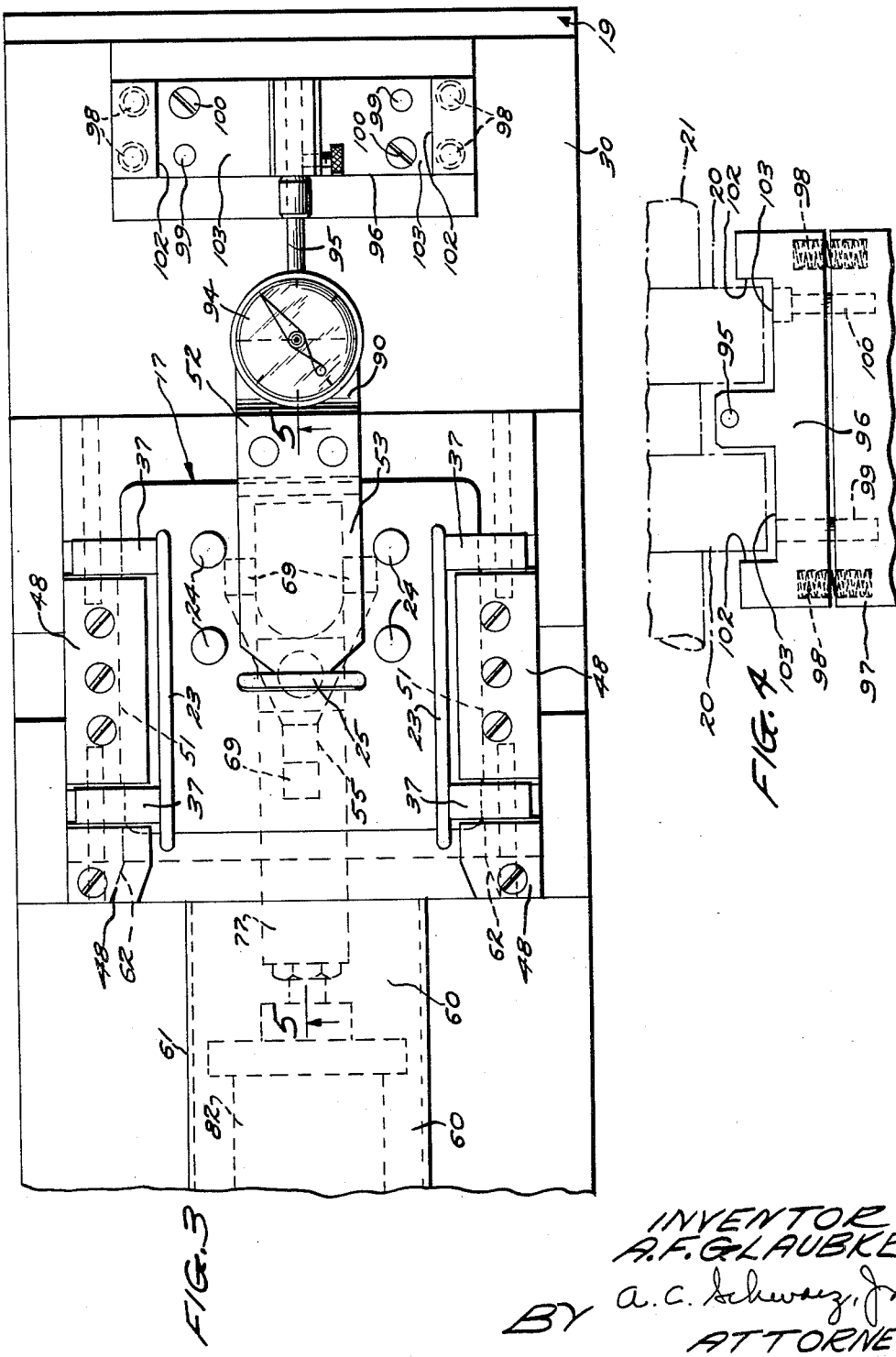
INVENTOR
A.F. GLAUBKE
BY a.C. Schwarz, Jr.
ATTORNEY March 27, 1962
A. F. GLAUBKE
3,027,154
ALIGNING AND CLAMPING FIXTURE
Filed Oct. 14, 1959
3 Sheets-Sheet 3
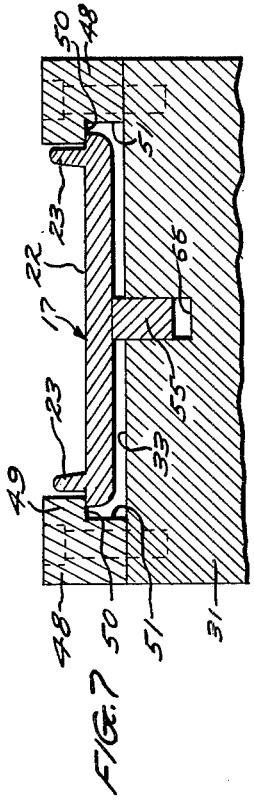
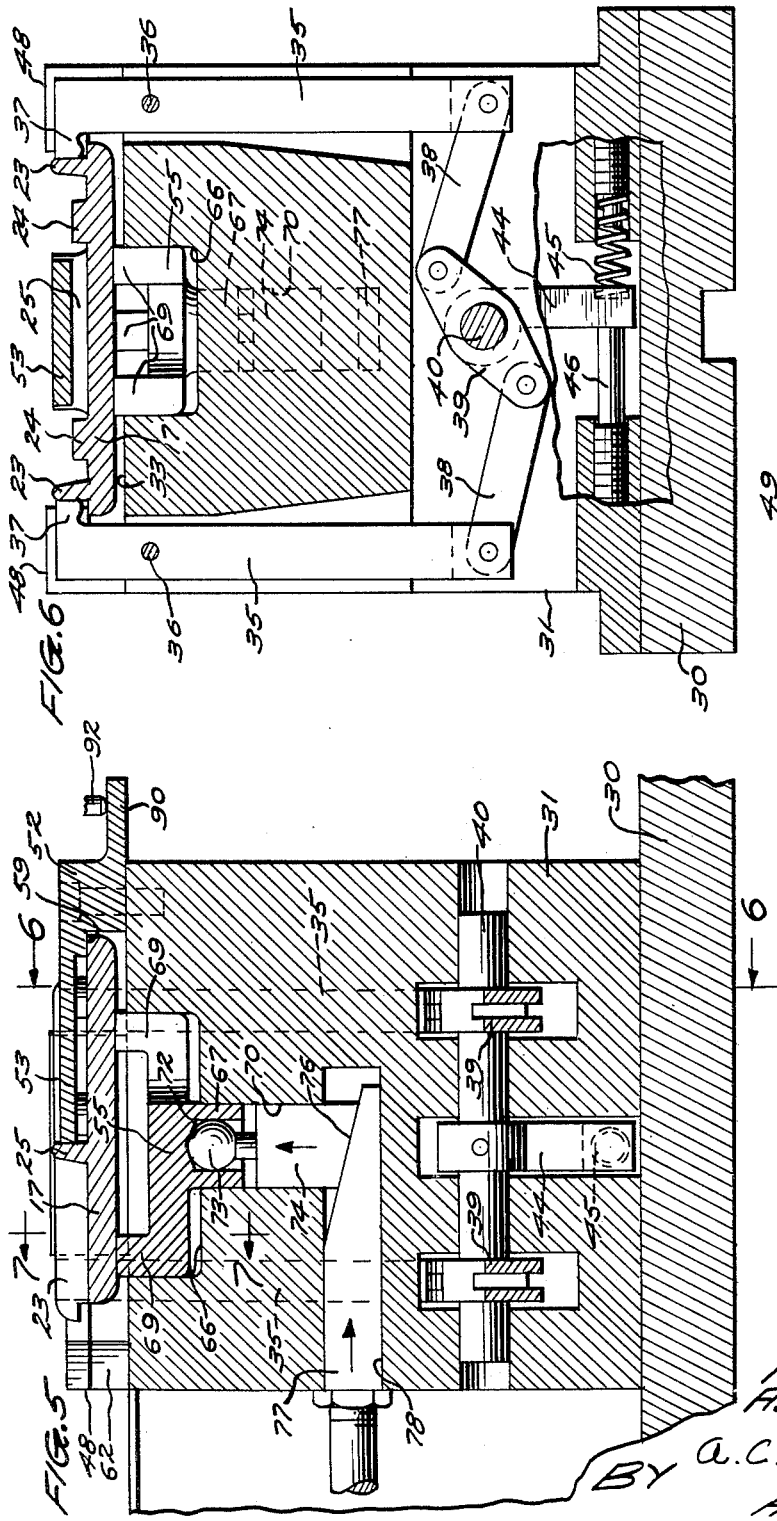
INVENTOR
A.F.GLAUBKE
BY A.C. Schwarz, Jr.
ATTORNEY

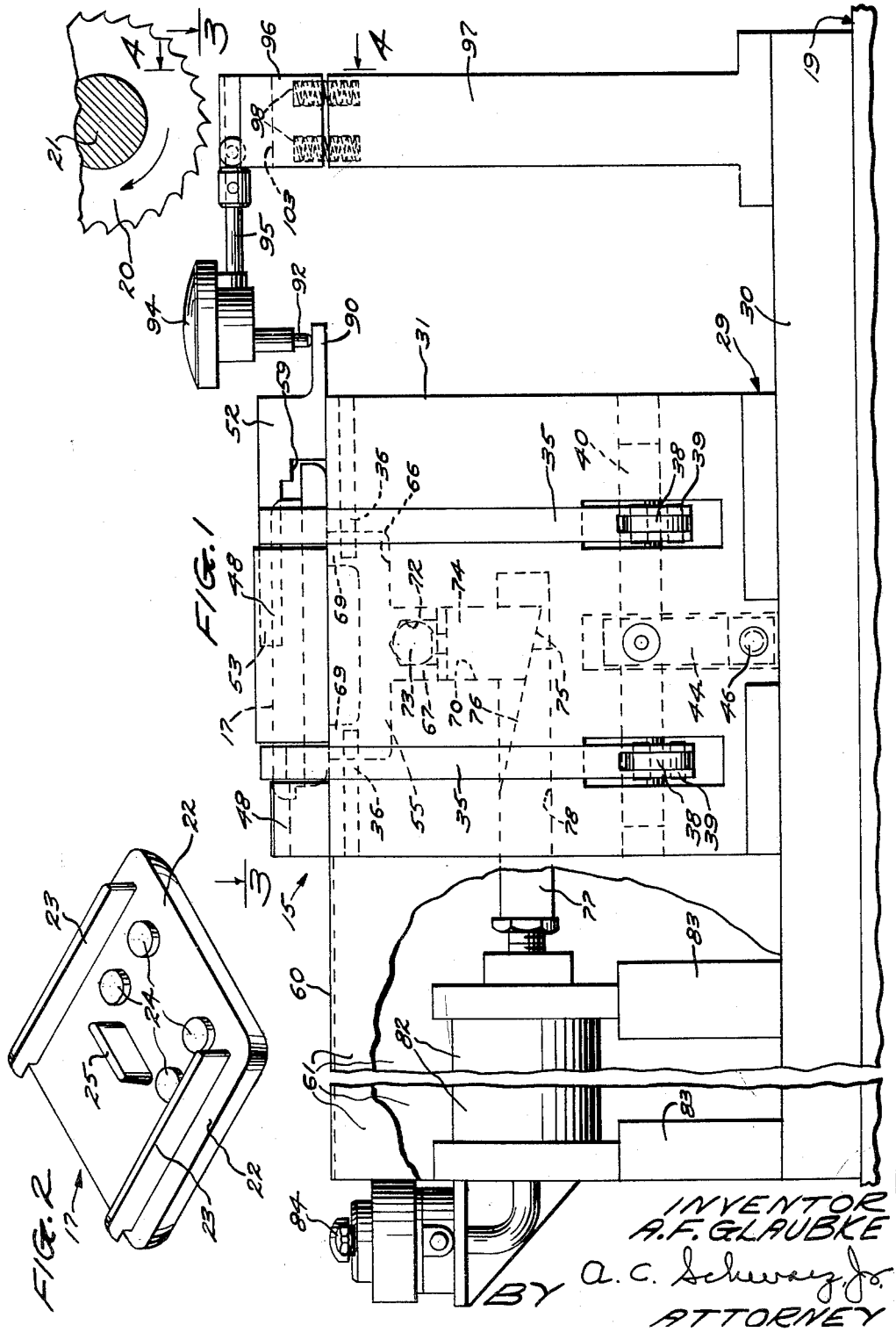

United States Patent Office 3,027,154
Patented Mar. 27, 1962

3,027,154
ALIGNING AND CLAMPING FIXTURE
Allen F. Glaubke, Indianapolis, Ind., assignor to Western Electric Company, Incorporated, New York, N.Y., a corporation of New York
Filed Oct. 14, 1959, Ser. No. 846,305
4 Claims. (Cl. 269—32)

This invention relates to an aligning and clamping fixture and more particularly to a fixture for aligning and clamping a work piece along a center line thereof and in a predetermined position to a cutter in a milling machine.

An object of the invention is to provide an improved aligning and clamping fixture.

Another object of the invention is to provide an improved fixture for aligning and clamping a piece part along a center line thereof and in a predetermined position to a cutter in a milling machine.

A further object of the invention resides in the provision of a fixture for clamping a piece part in a milling machine and having means for indicating the vertical relationship between the part and the milling cutter.

With these and other objects in view, the invention, as applied to an aligning and clamping fixture for a milling machine, contemplates the provision of a base having a platform for supporting a piece part for horizontal movement thereon to a clamping position between a pair of laterally spaced, fixed clamping elements and below downwardly directed locating faces thereon and above a lower clamping element movable on the base for clamping the piece part against the upper clamping elements.

As the piece part is moved horizontally to its clamping position on the platform it advances between and in engagement with the upper portions of two pairs of upright positioning members which are pivotally supported intermediate their ends on the base. The lower extremities of the positioning members are operatively connected by toggle linkages to a shaft that is mounted on the base for oscillatory movement about a horizontal axis along the center line of the base to connect the positioning members for equal and simultaneous movement in opposite directions and the members are stressed for pivotal movement to urge the upper ends thereof toward each other to centralize the piece part therebetween along the center line of the fixture.

A gaging member yieldably mounted on the base for limited vertical movement carries a dial indicator gage that has an operating plunger engaging a fixed surface of the fixture and the gaging member has a gaging surface engageable with the cutter of the milling machine so that the milling machine table with the fixture secured thereon may be moved vertically relative to the milling cutter until the indicator gage registers a predetermined value indicating a proper vertical relationship between the milling cutter and the work piece.

Other objects and advantages of the invention will become apparent by reference to the following detailed description thereof and the accompanying drawings disclosing a preferred embodiment thereof in which:

FIG. 1 is a side elevational view of the aligning and clamping fixture embodying the present invention;

FIG. 2 is a perspective view of a piece part of the type which is to be aligned and clamped in the present fixture;

FIG. 3 is a plan view of the fixture showing a piece part clamped therein with portions thereof broken away;

FIG. 4 is an end view of a portion of the fixture indicated by the lines 4—4 of FIG. 1;

FIG. 5 is a fragmentary vertical longitudinal sectional view of the fixture taken on line 5—5 of FIG. 3 and showing a piece part clamped therein;

FIG. 6 is a vertical cross sectional view of the fixture taken on line 6—6 of FIG. 5 and showing a piece part clamped therein; and FIG. 7 is a fragmentary cross sectional view of the fixture taken on line 7—7 of FIG. 5 and showing a piece part clamped therein.

Referring to the drawings, the present fixture 15 is designed to align and clamp a piece part or article 17 in a predetermined position thereon along the center line thereof and is adapted to be mounted on the table 19 of a milling machine for supporting the part 17 in a predetermined relation to a pair of milling cutters 20 mounted on the spindle 21 of the milling machine. As shown in FIG. 2, the piece part 17 is in the form of a flat door for a pay telephone coin box and is provided with flat surfaces 22 along the marginal edges thereof, a pair of parallel ribs 23 disposed in spaced relation to the lateral edges thereof, a plurality of spacing bosses 24, the ends of which are to be milled, and a transversely disposed rib 25.

The fixture comprises a composite base 29 including a horizontal plate 30 and a rectangular block 31 secured thereto and extending upwardly therefrom. The block 31 has a flat upper surface 33 for supporting a piece part 17 thereon and has virtually disposed grooves for receiving two pairs of upright positioning members 35 on opposite sides thereof.

The positioning members 35, in the form of bars, are pivotally mounted intermediate their ends on fixed pivot pins 36 and have upper ends extending above the upper surface 33 and provided with lateral inwardly directed projections 37 engageable with the ribs 23 of the piece part 17 for aligning the piece part along the center line of the fixture. The lower end of each of the aligning members 35 is pivotally connected to one end of a link 38, the other end of which is connected to one end of a lever 39 that is fixedly secured intermediate its ends to a shaft 40 and extends therefrom in opposite directions as shown in FIG. 6. The levers 39 on the shaft 40 and the links 38 form toggles for connecting the opposed aligning members 35 for equal and simultaneous movement in opposite directions.

An arm 44 fixed to the shaft 40 is urged by a spring 45 for turning movement in a clockwise direction, as viewed in FIG. 6, against an adjustable stop pin 46 to cause the upper ends of the positioning members 39 to be moved toward each other and yieldably maintained in a normal position with the projections 37 partly in the path of movement of the ribs 23 for engagement therewith to accurately align the article 17 along the center line of the fixture.

L-shaped clamping and positioning elements 48 are secured to the upper surface of the block 31 along opposed side edges thereof and have inwardly directed overhanging portions 49 provided with downwardly directed faces 50 engageable with the flat surface 22 of the piece part 17. Vertical surfaces 51 of the elements 48 form a guideway for guiding the piece part 17 substantially along the longitudinal center line of the fixture and between the positioning members 35. A stop member 52 secured to the upper surface 33 of the block 31 at one end thereof has a relatively thin portion 53 which extends laterally above the piece part 17 and the block 31 and is engageable with the transverse rib 25 on the piece part to stop the piece part 17 in clamping position between the upper clamping elements 48 and a lower movable clamping element 55. The member 52 is also provided with a shoulder having a downwardly directed locating surface 59 engageable with a portion of the flat surface 22 of the piece part 17.

To facilitate the insertion of the piece part 17 into its clamping position on the fixture a supporting platform 60 is provided to form an extension of the upper surface 33 of the block 31. The platform is made from a plate having downwardly extending side walls 61 suitably secured to the base. The end portions of the upper clamping elements 48 are chamfered outwardly as indicated at 62 to further facilitate the insertion of the part 17 between the elements 48 into clamping position.

The lower movable clamping element 55 is mounted in a recess 66 in the block 31 for vertical movement and comprises a central hub 67 with three arms directed outwardly therefrom, each of which is provided with an upwardly directed portion 69 engageable with the article 17. The hub 67 is slidable in a vertical guideway 71 and has a socket 72 for receiving a spherical end portion 73 of a vertical plunger 74 on which the lower clamping member 55 is supported for universal movement. The plunger 74 is guided for vertical movement in the guideway 70 and rests on a sloping cam surface 76 of a horizontally disposed plunger 77 slidably mounted in a guideway 78 in the block 31.

The plunger 77 is connected to a piston reciprocable within a cylinder of an air-operated actuator 82 which is fixedly supported on mounting brackets 83 secured to the base. In response to the admission of compressed air to the actuator 82 under control of a manually operable valve 84, the plunger 77 may be reciprocated to effect the vertical movement of the lower clamping member 55 and the clamping of the part 17 at a predetermined elevation against the locating surfaces 50 of the fixed clamping elements 48 and with the longitudinal center line of the piece part aligned with the longitudinal center line of the fixture.

Means are also provided for checking the relationship of the fixture and the part 17 clamped therein in a vertical direction relative to the pair of milling cutters 20 whereby the table 19 and the cutters 20 of the milling machine may be adjusted vertically relative to each other to obtain the proper orientation of the cutters 20 to the piece part 17.

As shown particularly in FIGS. 1, 3 and 4, this orienting means includes a fixed gage member 90 extending laterally from the stop member 52 on the block 31 and on which member 90 rests a movable actuating pin 92 of a dial indicator gage 94. The dial indicator gage has a mounting shank 95 secured to a gage block 96 which is mounted for limited vertical floating movement on a standard 97 secured to the base plate 30. Springs 98 fitting in recesses in the ends of the block 96 and in the standard 97 urge the block 96 upwardly and dowel pins 99 and screws 100 interconnecting the block 96 and the standard 97 guide the block 96 for vertical movement and limit the upward movement thereof. The gage block 96 (FIG. 4) has a pair of spaced recesses 102 for receiving the milling cutters 20 therein to check the position of the cutters 20 relative to each other and to the piece part 17 in a horizontal direction. The gage block 96 also has a pair of flat horizontal gaging surfaces 103 engageable with the milling cutters 20 for checking the position of the cutters in a vertical direction.

To orient the cutters vertically with respect to the piece part 17 clamped in the fixture 15, the milling table 19 is moved horizontally to locate the gage block 96 below and in vertical alignment with the milling cutters 20 after which vertical movement is effected between the table 19 and the milling cutters 20 to bring the milling cutters 20 into engagement with the gaging surfaces 103. Further vertical adjustment is effected until the dial indicator gage 94 registers a predetermined reading indicative of the proper vertical orientation of the milling cutters 20 to the part 17 in the fixture.

With the fixture 15 oriented vertically in the milling machine relative to the milling cutters 20, a part 17 may be loaded into the fixture by first placing it on the platform 60 and sliding it horizontally into clamping position in engagement with the stop 52 and with the marginal portions of the sides thereof positioned under the overhanging locating surfaces 50 of the fixed clamping elements 48. During the horizontal movement of the part 17 into clamping position the longitudinal ribs 23 of the part 17 will engage the inwardly directed projections 37 of the aligning members 35 and move them outwardly slightly against the opposing spring pressure thereof and the piece part 17 will be centered therebetween along the center line of the fixture.

The operator may then actuate the valve 84 to effect the upward movement of the lower clamping member 55 to cause it to clamp the piece part 17 in its centrally aligned position against the locating surface 50 of the fixed clamping elements 48. The piece part 17 is thereby located in the proper position relative to the cutters so that the milling machine may be operated to effect relative horizontal movement between the cutters 20 and the work piece 17 resulting in the milling of portions of the article 17 including the bosses 24 to predetermined dimensions.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A fixture for aligning and clamping an article comprising a base, fixed clamping elements on said base for locating the article at a predetermined elevation, a clamping element movably mounted on said base in vertically spaced relation to said fixed clamping elements, means for guiding an article along the longitudinal center line of said base between said fixed and movable clamping elements, a pair of upright aligning members pivotally mounted intermediate their ends on said base on opposite sides of said longitudinal center line and with the upper portions of the positioning members engageable with portions of the article for centering the article therebetween, a lever, means for pivotally supporting said lever intermediate its ends on said base for oscillatory movement about a horizontal axis along said longitudinal center line, links interconnecting the ends of said lever and the lower extremities of said aligning members for interconnecting said positioning members for equal and opposite movement, yieldable means for stressing said aligning members to urge the upper portions thereof toward each other into engagement with the article to center the article therebetween along said center line, and means for actuating said movable clamping element to clamp the article against said fixed clamping elements.

2. In an aligning and clamping fixture, a base, a pair of fixed clamping elements on said base, a clamping element movably mounted on said base in vertically spaced relation to said fixed clamping elements, means for guiding an article along the longitudinal center line of said base between said fixed and movable clamping elements, two pairs of opposed upright positioning members pivotally mounted intermediate their ends on said base on opposite sides of said center line with the upper portions of said positioning members engageable with portions of the article, a shaft mounted on said base for turning movement about a horizontal axis along said center line, toggle linkages interconnecting said shaft and the lower extremities of said positioning members for connecting the pairs of opposed positioning members for equal and opposite movement, resilient means for stressing said positioning members to urge the upper portions of said opposed positioning members toward each other into engagement with the article, and means for actuating said movable clamping element to clamp the article against the fixed clamping elements.

3. In an aligning and clamping fixture, a base having a horizontal surface for supporting an article thereon for movement along a longitudinal center line, clamping elements fixed to said base on opposite sides of the center line and having downwardly directed locating surfaces above and in vertically spaced relation to said flat supporting surface, a lower movable clamping element mounted for vertical movement on said base, a pair of upright aligning members pivotally mounted intermediate their ends on said base on opposite sides of said longitudinal center line and having portions extending above said horizontal supporting surface for engaging portions of the article for centering the article therebetween, a lever, means for pivotally supporting said lever intermediate its ends on said base for turning movement about a horizontal axis on said longitudinal center line, links interconnecting the ends of said lever and the lower extremities of said aligning members for connecting said members for equal and opposite movement, spring means for stressing said aligning members for pivotal movement to urge the upper portions thereof toward each other, means for stopping said aligning members with said upper portions in a normal position partly in the path of movement of the article so that in response to movement of the article therebetween the aligning members serve to center the article along said center line, and means for actuating said movable clamping member to clamp the article against the locating surfaces of said fixed clamping elements.

4. In an aligning and clamping fixture, a base, a pair of fixed clamping elements on said base, a clamping element movably mounted on said base in vertically spaced relation to said clamping elements, guide means on said base for guiding an article between said fixed and said movable clamping elements, means on said base for stopping the article in a clamping position in registration with said clamping elements, two pairs of upright positioning members, means for pivotally mounting said members intermediate their ends on said base with two members on each side of said center line and in opposed relation to the other two members and with the upper portions of said members engageable with the side portions of an article in said clamping position, a shaft mounted on said base for turning movement about a horizontal axis along said center line, a pair of levers fixedly secured to said shaft intermediate their ends and between said opposed positioning members, links pivotally interconnecting the ends of said levers and the lower extremities of said positioning members to interconnect the pairs of opposed positioning members for equal and opposite movement, an arm fixed to said shaft, spring means for turning said arm in one direction to stress said positioning members for pivotal movement and to urge the upper portions of said opposed positioning members toward each other into engagement with the article, adjustable means for stopping said arm to locate the upper portions of said positioning arms in normal positions partly in the path of movement of the article into gripping position, and means for actuating said movable clamping element to clamp the article against the fixed clamping elements.

References Cited in the file of this patent
UNITED STATES PATENTS

| | | |
|---|---|---|
| 2,139,251 | Aller | Dec. 6, 1938 |
| 2,177,399 | Aller | Oct. 24, 1939 |
| 2,673,386 | Cross | Mar. 30, 1954 |
| 2,690,705 | Cenerosky | Oct. 5, 1954 |
| 2,755,709 | Kalbow | July 24, 1956 |